US012626908B2

(12) United States Patent
Chen et al.

(10) Patent No.: US 12,626,908 B2
(45) Date of Patent: May 12, 2026

(54) SWELLING-INHIBITED SILICON-CARBON COMPOSITE ANODE MATERIAL WITH INCREASED CAPACITANCE, METHOD FOR PREPARING THE SAME, AND BATTERY HAVING THE SAME

(71) Applicants: SolidEdge Solution Inc., Hsinchu (TW); HON HAI PRECISION INDUSTRY CO., LTD., New Taipei (TW)

(72) Inventors: Mao-Sung Chen, Hsinchu (TW); Hong-Zheng Lai, Hsinchu (TW); Tseng-Lung Chang, Hsinchu (TW)

(73) Assignees: SolidEdge Solution Inc., Hsinchu (TW); HON HAI PRECISION INDUSTRY CO., LTD., New Taipei (TW)

( * ) Notice: Subject to any disclaimer, the term of this patent is extended or adjusted under 35 U.S.C. 154(b) by 989 days.

(21) Appl. No.: 17/731,395

(22) Filed: Apr. 28, 2022

(65) Prior Publication Data

US 2023/0187613 A1      Jun. 15, 2023

(30) Foreign Application Priority Data

Dec. 10, 2021     (CN) .......................... 202111509999.9

(51) Int. Cl.
H01M 4/36          (2006.01)
H01M 4/02          (2006.01)
(Continued)

(52) U.S. Cl.
CPC ......... H01M 4/366 (2013.01); H01M 4/0471 (2013.01); H01M 4/1395 (2013.01);
(Continued)

(58) Field of Classification Search
None
See application file for complete search history.

(56) References Cited

U.S. PATENT DOCUMENTS

2015/0270536 A1*   9/2015   Kawakami ............ H01M 4/366
                                                                          252/502
2017/0047584 A1*   2/2017   Hwang ................. H01M 4/366
(Continued)

FOREIGN PATENT DOCUMENTS

CN        103094533 A   *   5/2013
CN        106129411            11/2016
(Continued)

OTHER PUBLICATIONS

Yue et al., JP 2015-118911 Machine Translation (Year: 2015).*
(Continued)

*Primary Examiner* — Ula C Ruddock
*Assistant Examiner* — Anna Korovina
(74) *Attorney, Agent, or Firm* — ScienBiziP, P.C.

(57)          ABSTRACT

A method for preparing a swelling-inhibited silicon-carbon composite anode material with increased capacitance includes nanocrystallization of a silicon material to obtain a primary nano-silicon material in a protective environment, self-assembling the primary nano-silicon material with a first carbon source and a macromolecular polymer, and then adding a second carbon source for the self-assembly to obtain a secondary nano-silicon material with a layered structure. The method further includes granulating the secondary nano-silicon material to obtain a precursor, and sintering the precursor to obtain the silicon-carbon composite anode material. The method is simple and easy to control, and is tailored to industrial production. A battery with the silicon-carbon composite anode material on an anode electrode is also disclosed.

8 Claims, 6 Drawing Sheets

(51) Int. Cl.
  *H01M 4/04* (2006.01)
  *H01M 4/1395* (2010.01)
  *H01M 4/38* (2006.01)
  *H01M 4/62* (2006.01)
  *H01M 10/0525* (2010.01)

(52) U.S. Cl.
  CPC ........... *H01M 4/386* (2013.01); *H01M 4/625* (2013.01); *H01M 10/0525* (2013.01); *H01M 2004/027* (2013.01)

(56) References Cited

U.S. PATENT DOCUMENTS

| | | | | |
|---|---|---|---|---|
| 2018/0159132 A1* | 6/2018 | Gonser | ................. | H01M 4/134 |
| 2018/0375094 A1 | 12/2018 | He et al. | | |
| 2023/0369565 A1* | 11/2023 | Chen | ................... | H01M 4/1395 |

FOREIGN PATENT DOCUMENTS

| | | | | |
|---|---|---|---|---|
| CN | 107293696 | | 10/2017 | |
| CN | 109449385 | | 3/2019 | |
| CN | 110707314 A | | 1/2020 | |
| CN | 111755669 | | 10/2020 | |
| CN | 112952048 A | | 6/2021 | |
| CN | 113603892 A | * 11/2021 | ........ | H01M 10/0525 |
| JP | 2015118911 A | * 6/2015 | ........ | H01M 10/0525 |
| WO | WO-2017093460 A1 | * 6/2017 | .......... | H01M 4/1395 |
| WO | WO-2021113919 A1 | * 6/2021 | ............ | H01M 4/625 |

OTHER PUBLICATIONS

Guo et al., CN 103094533 Machine Translation (Year: 2013).*

Zhang, CN 113603892 Machine Translation (Year: 2021).*

Gonser WO 2017093460 Machine Translation (Year: 2017).*

Chen et al., Synthesis of non-conjugated double-bond RAFT agent and copolymerization with vinyl acetate, Polymer Materials Science and Engineering, 2017, 33 (6), 7-11; 10.16865/j.cnki. 1000-7555. 2017.06.002 (Year: 2017).*

* cited by examiner

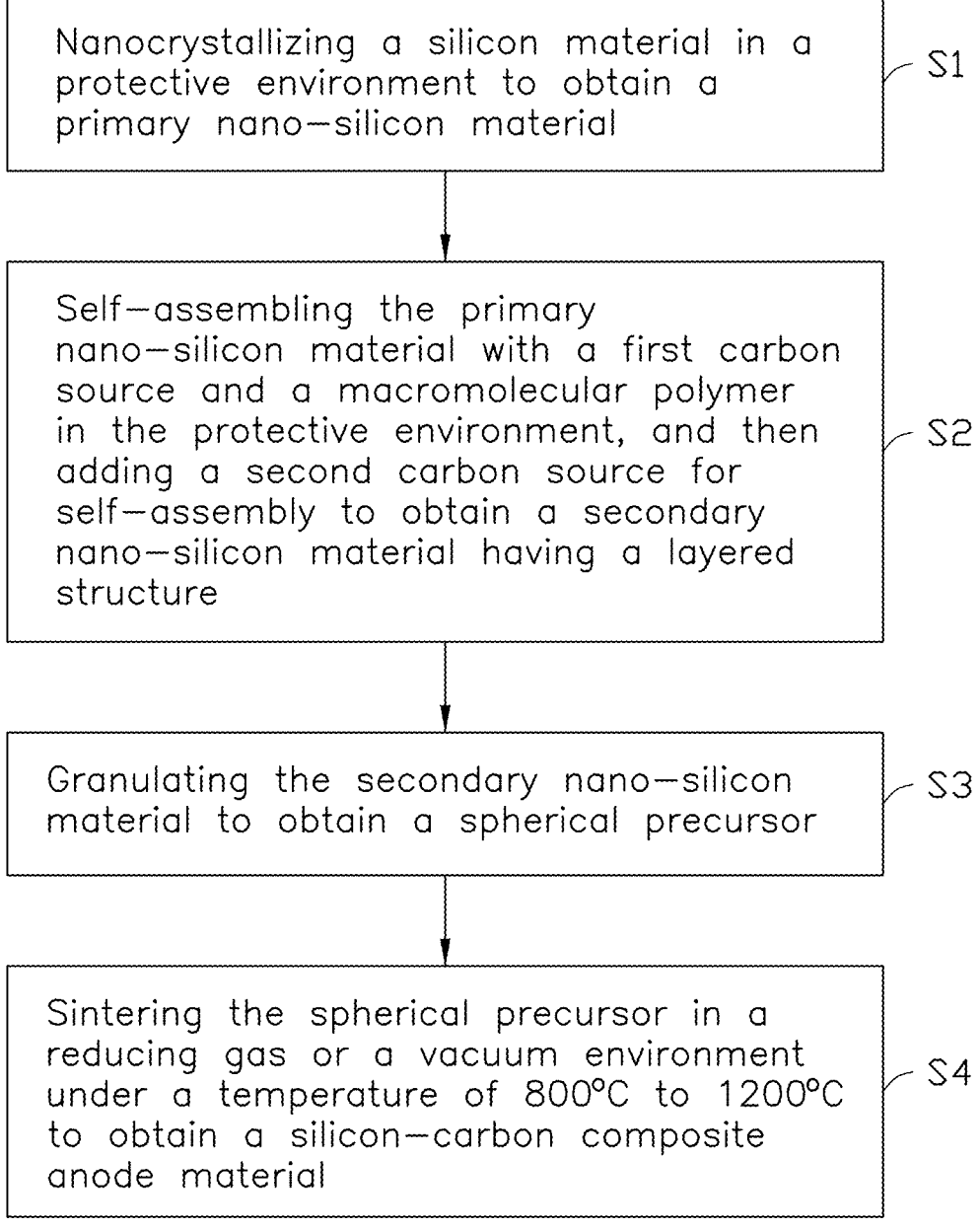

Nanocrystallizing a silicon material in a protective environment to obtain a primary nano-silicon material ⌐ S1

Self-assembling the primary nano-silicon material with a first carbon source and a macromolecular polymer in the protective environment, and then adding a second carbon source for self-assembly to obtain a secondary nano-silicon material having a layered structure ⌐ S2

Granulating the secondary nano-silicon material to obtain a spherical precursor ⌐ S3

Sintering the spherical precursor in a reducing gas or a vacuum environment under a temperature of 800°C to 1200°C to obtain a silicon-carbon composite anode material ⌐ S4

SWELLING-INHIBITED SILICON-CARBON COMPOSITE ANODE MATERIAL WITH INCREASED CAPACITANCE, METHOD FOR PREPARING THE SAME, AND BATTERY HAVING THE SAME

FIELD

The subject matter herein generally relates to batteries, and more particularly, to a silicon-carbon composite anode material, a method for preparing the silicon-carbon composite anode material, and a battery comprising the silicon-carbon composite anode material.

BACKGROUND

Silicon is used as an anode material, and due to its advantages over graphite of low cost, being environmentally friendly, with a high specific capacity (4200 mAh g$^{-1}$), a high voltage platform, and no lithium deposition on its surfaces during charging. However, the silicon material may swell considerably (~300%) during lithiation and shrink sharply during delithiation. These repeated and severe volume changes (also called volume effect) may cause cracking and powderization of the silicon material, resulting in structural collapse and loss of electrical contact between the anode material and a current collector, reducing the cycling ability and stability of a battery. Furthermore, because of the volume effect, it is difficult for the silicon material to form a stable solid electrolyte interface (SEI) in the electrolyte. With surface destruction of the structure, new silicon is exposed on the surface to continuously form an SEI film, which may aggravate corrosion of the silicon material and reduction in capacitance.

Thus, the silicon material is usually oxidized to form a silicon oxide shell, which may inhibit swelling of the silicon material. However, the conductivity of silicon oxide is low, which may slow down the transfer of charge. In addition, the cycling performance is impacted by lithium-ion consumption.

BRIEF DESCRIPTION OF THE DRAWINGS

Implementations of the present disclosure will now be described, by way of embodiments only, with reference to the attached figures.

FIG. 1 is a flowchart of a method for preparing a silicon-carbon composite anode material according to an embodiment of the present disclosure.

DETAILED DESCRIPTION

Figure 2:
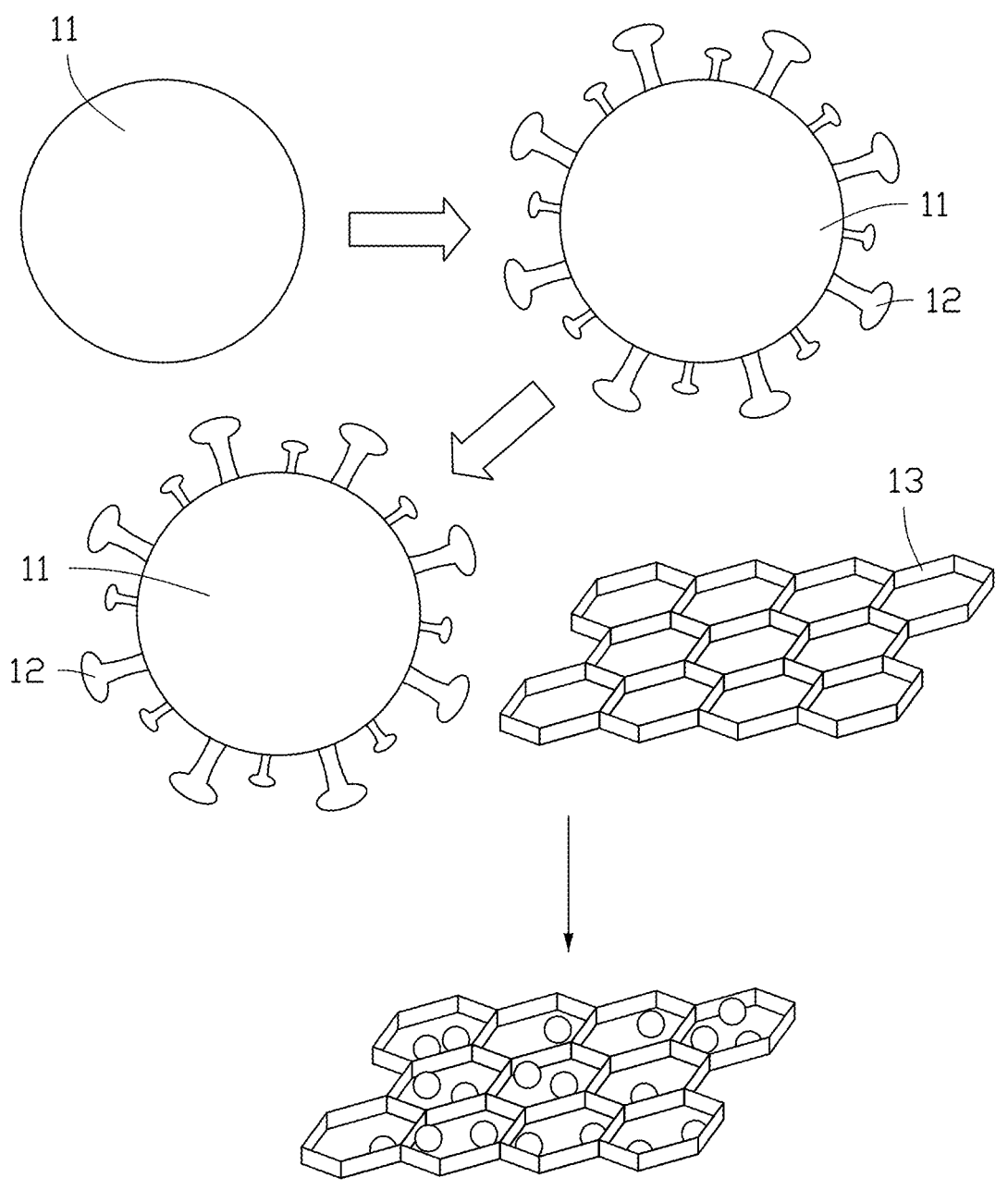
FIG. 2 is a diagrammatic view showing a self-assembly process of a homogenous carbon substrate, a macromolecular polymer, and a primary nano-silicon material according to an embodiment of the present disclosure.

Unless otherwise defined, all technical and scientific terms used herein have the same meaning as commonly understood by persons skill in the art. The terms used herein are only for the purpose of describing specific embodiments, and not intended to limit the embodiments of the present application.

In this application, descriptions such as "first", "second" etc. are only used for description purposes and should not be understood as indicating or implying their relative importance or implying the number of indicated technical features. Thus, a feature defined as "first" and "second" may expressly or implicitly include at least one of that features. In the description of the present application, "plurality" means more than one unless expressly and specifically defined otherwise.

Some embodiments of the present application will be described in detail below with reference to the drawings. The following embodiments and features of the embodiments may be combined with each other in the absence of conflict.

Referring to FIG. 1, an embodiment of the present disclosure provides a method of preparing a silicon-carbon composite anode material, the method comprises the following steps:

S1: in a protective environment, nanocrystallizing a silicon material to obtain a primary nano-silicon material. The protective environment is an environment under vacuum, or the protective environment is obtained by introducing an inert gas or solvent.

In some embodiments, the silicon material may be the silicon material having a particle size greater than 10 μm (semiconductor grade). The nanocrystallization includes, but is not limited to, mechanical processing, mechanical ball milling, etc. The mechanical ball milling can be dry milling or wet milling. The primary nano-silicon material can also be prepared by chemical deposition method or physical vapor deposition method, in an alkane atmosphere such as CH$_4$ during the deposition process to form a carbon coating on the primary nano-silicon material. The carbon coating is further sintered to form a carbonization layer on the primary nano-silicon material. However, these deposition methods have high cost and are not suitable for large-scale industrial production.

In some embodiments, the inert gas includes at least one of argon (Ar), nitrogen (N$_2$), and helium (He). The inert gas can provide an oxygen-free environment, prevent the nano-silicon from being oxidized, and render the prepared silicon-carbon composite anode material free of SiO$_x$, which is beneficial to improve electrochemical performance of the silicon-carbon composite anode material and reduce the volume effect.

In some embodiments, the solvent may be diethylene glycol (DEG), polyethylene glycol (PEG), propylene glycol (PG), dimethyl sulfoxide (DMSO), or a combination thereof. The above solvents can prevent the nano-silicon from being oxidized, so that the prepared silicon-carbon composite anode material is free of SiO$_x$, which is beneficial to improve the electrochemical performance of the silicon-carbon composite anode material and reduce the volume effect.

In some embodiments, a particle size of the primary nano-silicon material is 10 nm to 50 nm, beneficial for the subsequent self-assembly and coating processes, and a final silicon-carbon composite anode material with a suitable particle size is prepared, which is suitable for the pulping process of the current secondary battery.

S2: in the protective environment, self-assembling the primary nano-silicon material with a first carbon source and a macromolecular polymer, and then adding a second carbon source for self-assembly to obtain a secondary nano-silicon material with a layered structure.

In some embodiments, the macromolecular polymer is an amphiphilic polymer having both a hydrophobic group and a hydrophilic group. The macromolecular polymer can be N-allyl-(2-ethylxanthate) propionamide (NAPA), dimethyl-formamide (DMF), or a combination thereof. The macromolecular polymer is a medium containing amino groups and hydroxyl groups. The hydrophilicity and hydrophobicity as different characteristics between the primary nano-silicon material and the carbon substrate (the first carbon source and the second carbon source can be collectively referred to as the carbon substrate) are improved by the macromolecular polymer with a hydrophilic group at one end and a hydro-phobic group at the other end.

Specifically, referring to FIG. 2, the hydrophilic group at one end of a macromolecular polymer 12 can bond with a primary nano-silicon material 11, and the hydrophobic group on the other end of the macromolecular polymer 12 can bond with a carbon substrate 13, so that the primary nano-silicon material 11 is firmly coated on the carbon substrate 13, and will tend to not agglomerate with other primary nano-silicon material 11. The carbon substrate 13, the macromolecular polymer 12, and the primary nano-silicon material 11 can thus be bonded together to form a layered structure.

Furthermore, the self-assembly may be carried out by mechanical machining, electrical discharge machining, or mechanical ball milling. The mechanical ball milling can be dry milling or wet milling.

In some embodiments, the first carbon source includes at least one of asphalt, graphite, and graphene. The first carbon source has a layered structure, which can form a carbon buffer layer for wrapping the primary nano-silicon material therein. Thus, the first carbon source inhibits swelling of the primary nano-silicon material and reduces the volume effect. In addition, during the self-assembly, particle escape can cause an exothermic reaction, and the first carbon source diffuses heat to avoid agglomeration and prevent the primary nano-silicon material from being oxidized due to the exo-thermic phenomenon.

In some embodiments, the second carbon source includes at least one of carbon black, carbon nanotube, and carbon nanofiber. The second carbon source can form a carbon conductive layer for wrapping the carbon buffer layer. The second carbon source has a higher conductivity than the first carbon source, and the carbon conductive layer can provide transfer of charge to improve capacitance. Moreover, during the self-assembly, the second carbon source can also diffuse heat to avoid agglomeration and prevent the nano-silicon from being oxidized.

S3: in the protective environment, granulating the sec-ondary nano-silicon material to obtain a spherical precursor.

Furthermore, a particle size of the spherical precursor after granulation can range from 5 μm to 10 μm. As such, the spherical precursor is suitable for the pulping process of the secondary battery, and avoids agglomeration in the follow-ing sintering process.

S4: sintering the spherical precursor in a reducing gas or a vacuum environment to obtain the silicon-carbon compos-ite anode material, the sintering temperature is from 800° C. to 1200° C.

In some embodiments, the reducing gas includes a mix-ture of nitrogen and hydrogen. Sintering in the reducing gas can remove excess functional groups on the surface and increase the compactness and integrity of the carbon sub-strate. The reducing gas can also prevent the nano-silicon core from being oxidized.

It can be understood that the numbering of the above steps is intended to describe the specific preparation method, but not to limit the sequence of the steps.

Figure 3:
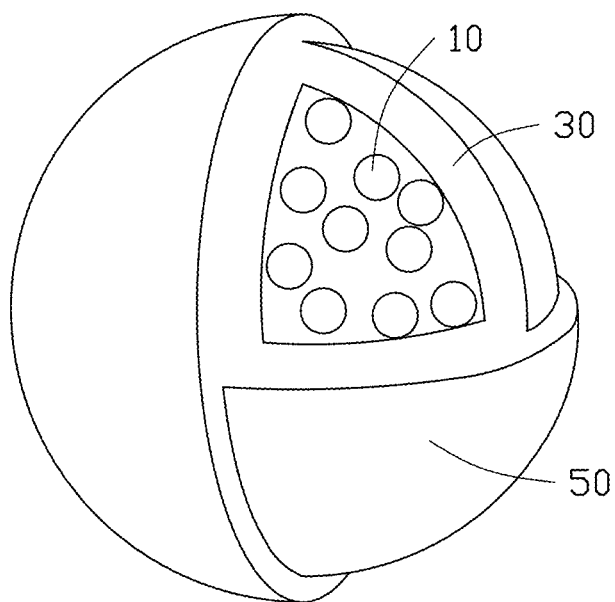
FIG. 3 is a diagrammatic view of a silicon-carbon composite anode material according to an embodiment of the present disclosure.

The present application further provides a silicon-carbon composite anode material, which is prepared by the above-mentioned preparation method. Referring to FIG. 3, a sili-con-carbon composite anode material 100 includes a nano-silicon core 10, a carbon buffer layer 30 wrapping the nano-silicon core 10, and a carbon conductive layer 50 wrapping the carbon buffer layer 30. The nano-silicon core 10 improves the diffusion rate of lithium ions, and the carbon buffer layer 30 and the carbon conductive layer 50 coated on the nano-silicon core 10 can prevent the nano-silicon core 10 from directly contact with the electrolyte. A stable SEI film is formed on the surface of the silicon-carbon composite anode material 100, which can greatly improve the cycling performance of the material. In addition, the silicon-carbon composite anode material 100 is an oxide-free material, and has the carbon buffer layer 30 including a first carbon source, which can effectively inhibit the volume effect. The carbon conductive layer 50 can improve the charge transfer to increase capacitance.

The silicon-carbon composite anode material of the pres-ent application is completely free of oxide or almost free of oxide (of silicon oxide especially), for example, containing no more than 0.1 wt % of oxides based on the mass of the silicon-carbon composite anode material.

Figure 4:
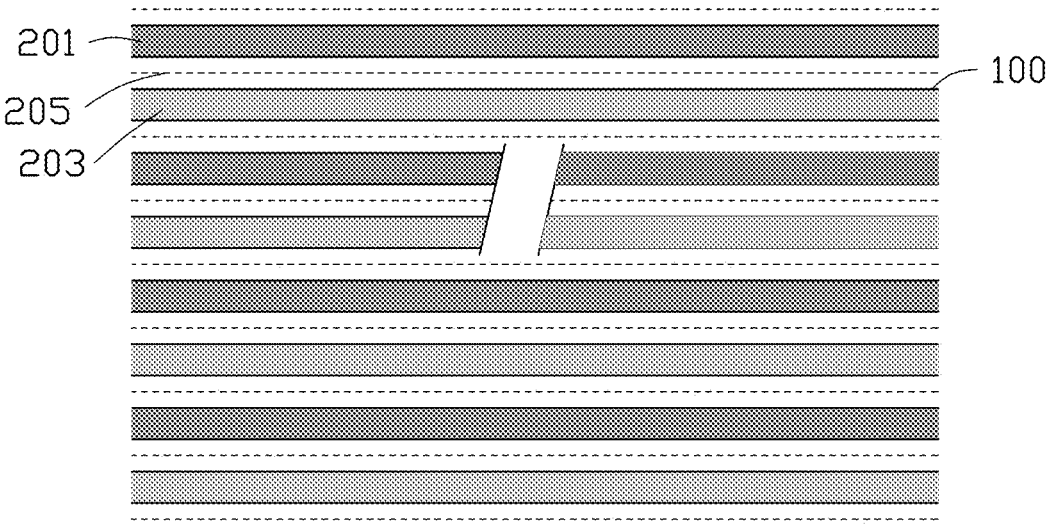
FIG. 4 is a diagrammatic view of a battery with the silicon-carbon composite anode material according to an embodiment of the present disclosure.

Referring to FIG. 4, the present application further pro-vides a battery 200, including a cathode electrode 201, an anode electrode 203, and a separator 205. The anode elec-trode 203 includes the silicon-carbon composite anode mate-rial 100. The battery 200 may be a secondary battery, such as, but is not limited to, a lithium-ion secondary battery, a sodium-ion battery, and the like.

In the present application, the silicon material is nanoc-rystallized in a protective environment, and then ground with the first carbon source and the macromolecular poly-mer. The primary nano-silicon material, the first carbon source, and the macromolecular polymer undergo the self-assembly due to the hydrophilic and hydrophobic properties of the macromolecular polymer, thereby forming the carbon buffer layer (composed of the first carbon source) which inhibits swelling. Then, the second carbon source is added to cover the carbon buffer layer, and the carbon conductive layer formed by the second carbon source enables the charge transfer resistance to improve capacitance. After the self-assembly, the granulation and sintering steps are performed to obtain the silicon-carbon composite anode material. The silicon-carbon composite anode material has a high specific capacity (>1600 mAh·g$^{-1}$).

Example 1

S1: Silicon material (semiconductor grade, ≥10 μm) and diethylene glycol (solvent) were added into a horizontal type grinding machine with a speed of 2400 rpm to 3000 rpm for mechanical processing to obtain a primary nano-silicon material with a particle size distribution between 10 nm to 50 nm.

S2: N-allyl-(2-ethylxanthate) propionamide (macromo-lecular polymer, the mass is 5% of the mass of the silicon material) and graphite (first carbon source, the mass is 5%~10% of the mass of the silicon material) were added to the primary nano-silicon material for grinding to make the N-allyl-(2-ethylxanthate) propionamide, the graphite, and the primary nano-silicon material stack and self-assemble in an orderly manner. Then carbon nanotube (the second carbon source, the mass is 1~5% of the mass of the silicon material) was added for grinding to obtain a secondary nano-silicon material with a layered structure.

In the grinding machine, the temperature difference between the core grinding temperature and the temperature of the slurry outlet should not exceed 5° C. In this way, the oxidation of the nano-silicon by excess heat is prevented.

S3: The secondary nano-silicon material was spray drying to obtain a precursor with a particle size of 5 μm to 10 μm.

S4: The precursor was put into a sintering furnace containing a mixture of nitrogen and hydrogen (the volume percentage of hydrogen is 3%) to be heated at 800 degrees Celsius to 1200 degrees Celsius for 12 hours to obtain a silicon-carbon composite anode material, wherein the flow rate of the mixture of nitrogen and hydrogen is 2 L/min.

Comparative Example 1

The difference between Comparative Example 1 and Example 1 is only that in step S4, the reducing gas in Comparative Example 1 is nitrogen. The remaining conditions are the same as those in Example 1, which will not be repeated here.

Figure 5:
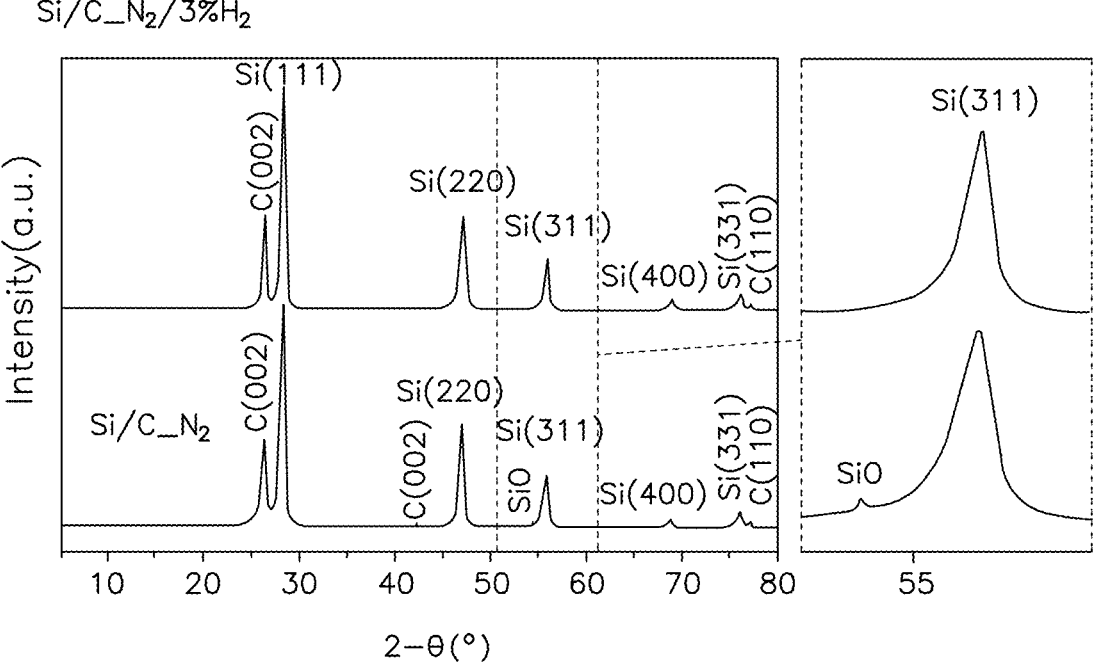
FIG. 5 is an XRD (X-Ray diffraction) pattern of the silicon-carbon composite anode materials prepared in Example 1 and Comparative Example 1.

The XRD pattern of the silicon-carbon composite anode materials prepared in Example 1 and Comparative Example 1 are shown in FIG. 5. FIG. 5 shows that the silicon-carbon composite anode material prepared in Example 1 has characteristic peaks of Si (Cubic, Fd-3m(227)) and C (Hexagonal, p63/mmc(194)) but no silicon oxide, indicating that the silicon-carbon composite anode material prepared in Example 1 does not exist silicon oxide (SiO$_x$). In contrast, the silicon-carbon composite anode material prepared in Comparative Example 1 shows characteristic peaks of SiO, indicating that a small amount of nano-silicon was oxidized. As a result, the protective effect of the nitrogen-hydrogen blend is better than that of nitrogen.

Figure 6:
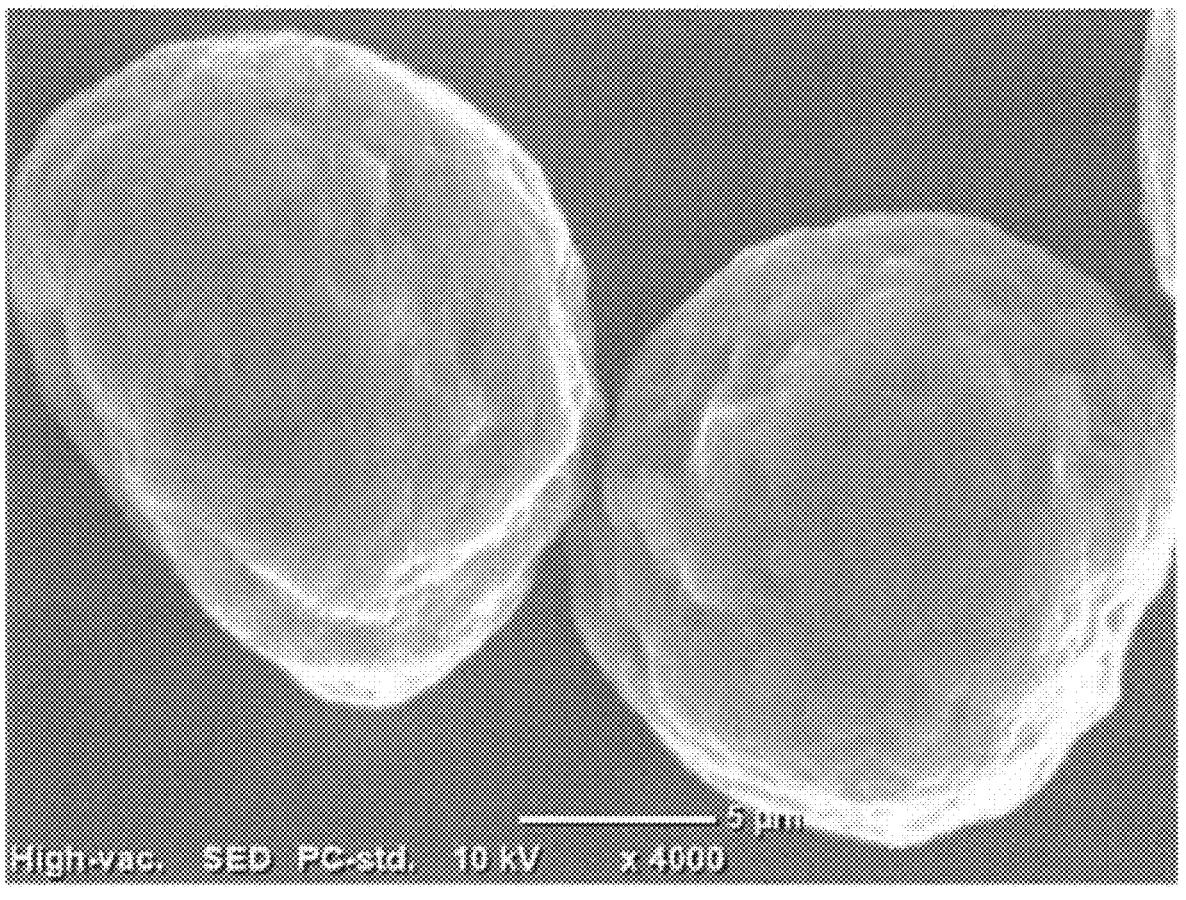
FIG. 6 is an SEM (scanning electron microscope) image of the silicon-carbon composite anode material prepared in Example 1.

The SEM image of the silicon-carbon composite anode material prepared in Example 1 is shown in FIG. 6. FIG. 6 demonstrates that the particle surface of the silicon-carbon composite anode material prepared in Example 1 is smooth, indicating the formation of an efficient carbon layer.

Three samples from Example 1 were selected, these being designated as Sample 1, Sample 2, and Sample 3. The three samples were dissolved in water with a conductive agent (conductive carbon black, Super P) and a binder (styrene-butadiene rubber, SBR) in a mass ratio of 88:1:11 (silicon-carbon composite anode material: Super P:SBR) to obtain a mixture formulated into a slurry with a solid content of 50%. The slurry was coated on a copper foil and vacuum-dried to obtain an anode electrode. Then, a ternary cathode electrode, electrolyte with a lithium salt concentration of 1 mol/L (composition of LiPF$_6$/EC+DMC+EMC), and a separator (Celgard2400) were stacked and assembled for 5 Ah pouch cell by conventional production process. The cells assembled from Sample 1 is referred to as Battery 1, the cells assembled from Sample 2 is referred to as Battery 2, and the cells assembled from Sample 3 is referred to as Battery 3. The Battery 1, Battery 2, and Battery 3 were subjected to the following performance tests.

Delithiation capacity test of the cathode electrode: the current density is 0.1C, the voltage rises to 4.2V, and the gram capacity of anode electrode is converted according to the following formula (1), to obtain the Delithiation capacity.

$$Q(\text{mAh} \cdot \text{g}^{-1}) = \frac{\text{Rated Capacity (mAh)}}{\text{Coating weight per unit area}\left(\dfrac{\text{g}}{\text{cm}^2}\right) \cdot \text{Total area of current collector } (\text{cm}^2)}$$

Lithiation capacity test of the cathode electrode: the current density is 0.1C, the voltage drops to 2.0V, and the gram capacity of anode electrode is converted to obtain the Lithiation capacity.

Efficiency=Delithiation capacity/Lithiation capacity× 100%

The results of the above tests are shown in Table 1.

TABLE 1

| | Delithiation capacity (mAh · g$^{-1}$) | Lithiation capacity (mAh · g$^{-1}$) | Efficiency (%) |
|---|---|---|---|
| Battery 1 | 1580 | 1790 | 88.3 |
| Battery 2 | 1587 | 1800 | 88.2 |
| Battery 3 | 1536 | 1780 | 86.3 |

Table 1 reveals that the battery assembled with the silicon-carbon composite anode material prepared by the method of the present application has high capacity and efficiency, indicating that the silicon-carbon composite anode material prepared by the present application does inhibit the volume swelling and improves the electrical conductivity and capacitance.

In the present disclosure, during the charge-discharge cycle, no irreversible oxides are generated, so that lithium-ion consumption is reduced, thus improving efficiency. The carbon buffer layer of the silicon-carbon composite anode material inhibits swelling, and the carbon conductive layer can enable transfer of charge to increase capacitance and improve the electrochemical performances of the silicon-carbon composite anode material. The preparation process for silicon-carbon composite anode is simple, easy to control and suitable for industrial production.

The above descriptions are some specific embodiments of the present application, but the actual application process is not to be limited only to these embodiments. For those of ordinary skill in the art, other modifications and changes made according to the technical concept of the present application should all belong to the protection scope of the present application.

What is claimed is:

1. A method of preparing a silicon-carbon composite anode material, comprising:

nanocrystallizing a silicon material in a protective environment to obtain a primary nano-silicon material, wherein the protective environment is a vacuum environment, or the protective environment is obtained by introduction of an inert gas or a solvent;

self-assembling the primary nano-silicon material with a first carbon source and N-allyl-(2-ethylxanthate) propionamide in the protective environment, and then adding a second carbon source for the self-assembly to obtain a secondary nano-silicon material having a layered structure, and the N-allyl-(2-ethylxanthate) propionamide has a hydrophobic group and a hydrophilic group;

granulating the secondary nano-silicon material to obtain a spherical precursor; and sintering the spherical precursor in a reducing gas or a vacuum environment under a temperature of 800° C. to 1200° C. to obtain the silicon-carbon composite anode material.

2. The method of claim 1, wherein the first carbon source comprises at least one of asphalt, graphite, and graphene.

3. The method of claim 1, wherein the second carbon source comprises at least one of carbon black, carbon nanotube, and carbon nanofiber.

4. The method of claim 1, wherein the inert gas comprises at least one of argon, nitrogen, and helium.

5. The method of claim 1, wherein the solvent comprises at least one of diethylene glycol, polyethylene glycol, propylene glycol, and dimethyl sulfoxide.

6. The method of claim 1, wherein the reducing gas comprises a mixture of nitrogen and hydrogen.

7. The method of claim 1, wherein a particle size of the primary nano-silicon material is 10 nm to 50 nm.

8. The method of claim 1, wherein a particle size of the spherical precursor is 5 µm to 10 µm.

* * * * *